United States Patent [19]

Kryter

[11] Patent Number: 4,595,098
[45] Date of Patent: Jun. 17, 1986

[54] STORAGE CASE FOR MAGNETIC TAPE CASSETTES, THEIR BOXES AND THE LIKE

[76] Inventor: Karl D. Kryter, P.O. Box 750, Bodega Bay, Calif. 94923

[21] Appl. No.: 681,445

[22] Filed: Dec. 13, 1984

[51] Int. Cl.[4] .......................................... B65D 85/672
[52] U.S. Cl. ................................... 206/387; 206/454; 206/564; 220/22; 312/9
[58] Field of Search ............... 206/387, 334, 454, 456, 206/564, 565, 561, 558, 557; 211/40, 41; 220/22; 312/9, 10, 12

[56] References Cited

U.S. PATENT DOCUMENTS

| | | | |
|---|---|---|---|
| 1,484,291 | 2/1924 | Blakeslee | 211/41 |
| 1,810,199 | 6/1931 | Blakeslee et al. | 211/41 |
| 3,559,866 | 2/1971 | Olson, Sr. | 206/454 |
| 3,627,113 | 12/1971 | Di Iola | 206/387 |
| 3,756,383 | 9/1973 | Kryter | 206/387 |
| 3,830,363 | 8/1974 | Liber | 206/387 |
| 3,938,871 | 2/1976 | Bartholomew | 206/387 |
| 4,164,309 | 8/1979 | Staats | 190/115 |
| 4,201,298 | 5/1980 | Larson et al. | 206/387 |
| 4,231,473 | 11/1980 | Aprahamian | 206/387 |
| 4,382,517 | 5/1983 | Welsch | 206/454 |

FOREIGN PATENT DOCUMENTS 2453842  5/1976  Fed. Rep. of Germany ...... 206/387

Primary Examiner—William Price
Assistant Examiner—Jimmy G. Foster
Attorney, Agent, or Firm—Victor R. Beckman

[57] ABSTRACT

A storage case for magnetic tape cassettes and their boxes is shown which includes a bottom box portion and rearwardly hinged top portion. The bottom portion includes a bottom wall, front and back walls, and opposite side walls. A plurality of parallel upwardly extending ribs are formed on the bottom wall. The spacing between ribs is slightly greater than the width of cassette boxes whereby boxes may be stored on the bottom wall between ribs. A pair of said ribs extends upwardly above the other ribs, which taller ribs are formed with notches which are slightly wider than the width of cassette tapes for support of cassette tapes above the bottom wall in a direction transverse to the parallel ribs. Flanges on the cassette tapes are located between the notched ribs and limit movement of the cassette tapes in the direction transverse to the parallel ribs.

14 Claims, 5 Drawing Figures

STORAGE CASE FOR MAGNETIC TAPE CASSETTES, THEIR BOXES AND THE LIKE

BACKGROUND OF THE INVENTION

The art is replete with storage cases of all kinds having miriads of different dividers, compartments and ribbed configurations for containing the stored contents. The nature of these many constructions, however, forbids great flexibility in storing differentdimensioned items without either changing the position of dividers or compartments to adjust for the different numbers of different-dimensioned items that happen to be at hand at different times, or wasting space by using a large inflexible space that was formed for large items, when only a small item is on hand for storage. This problem is particularly of concern where items to be stored may or may not be contained in their own boxes, which, of course, are inherently of greater dimensions than the items. Among such items are magnetic tape cassettes and the like.

Storage cases for magnetic tape cassettes, their boxes, and the like, are shown, for example, in U.S. Pat. Nos. 3,756,383 - Kryter; 4,117,931 - Berkman; 4,182,538 - Armistead; 4,394,055 - Smith; 4,411,481 - Berkman; and 4,440,458 - Berkman. Although the above-identified patents provide for storage of different sized articles, much space often is wasted to accommodate such different sized articles thereby resulting in a rather bulky storage device.

SUMMARY OF THE INVENTION AND OBJECTS

A primary object of this invention is the provision of a novel storage case which is very inexpensively constructed and which avoids the shortcomings and problems of prior art arrangements.

A further object is to provide a novel storage case of more general utility, as well.

The above and other objects and advantages of this invention are achieved by means of a storage case having sections which are adapted for storing a plurality of first devices, such as magnetic tape cassettes, in parallel, and/or a plurality of second devices, such as their boxes, in parallel in a direction transverse to the first devices. The case has a substantially rectangular bottom portion including bottom sections for receiving such cassettes and/or boxes in each section, and a rearwardly hinged top portion for the bottom of the case. The bottom portion is of a height less than that of the tape cassettes and their boxes, and the top portion therefor is of a height at least sufficient when closed to cover the cassettes and/or their boxes. Each section of the case has ribs extending in a front-to-back direction upwards from the bottom of the case, which ribs are spaced apart such as to hold upright cassette boxes in parallel from front-to-back direction in a section of the case, with the boxes resting on the bottom of the case. The length from front-to-back of each section is slightly greater than the length of the cassette boxes such that the boxes will fit within the section without excessive sliding motion from front-to-back.

Two of said ribs in each section are taller than adjacent ribs, and are formed with notches along the upper edge thereof which notches are of such a depth as to hold cassettes placed lengthwise from side-to-side in a section of the case upright and elevated above the bottom of the case. The tops of the cassettes may extend to the height of, or somewhat below, the tops of cassette boxes when placed in the case. Each section of the case is slightly wider from side-to-side than the length of a cassette to accommodate the same. The taller notched ribs are spaced apart at a distance such that the central flanges at the lower edge of standard cassettes fall between said pair of notched ribs such that the flanges will prevent the cassette from sliding from side-to-side within the case.

BRIEF DESCRIPTION OF THE DRAWINGS

The invention, together with other objects and advantages thereof, will be better understood from the following description when considered with the accompanying drawings. In the drawings, wherein like reference characters refer to the same arts in the several views.

Figure 1:
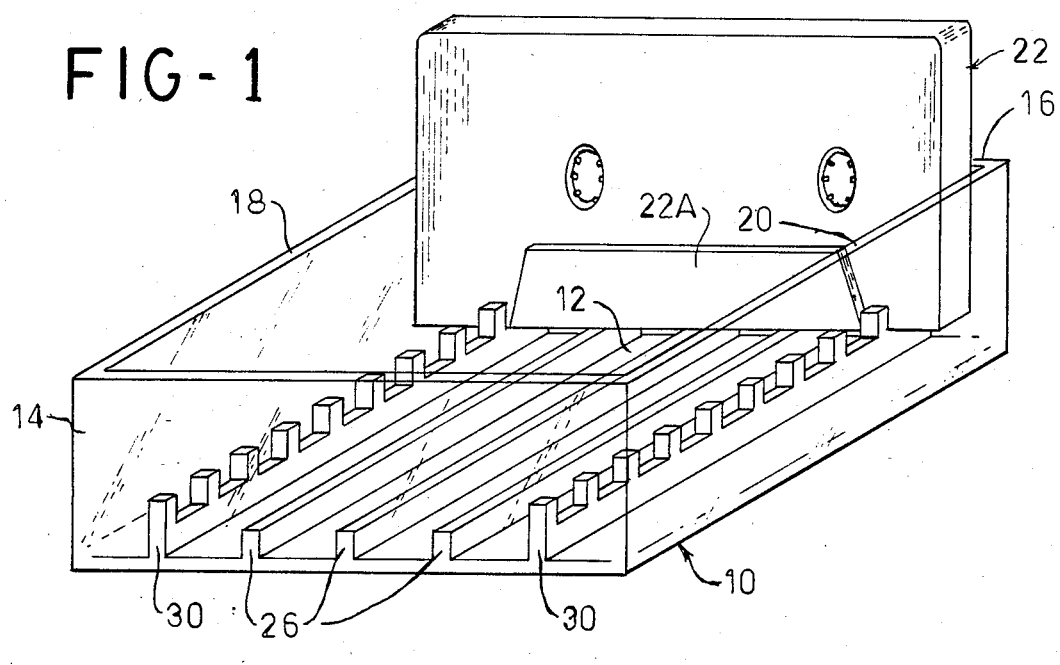
FIG. 1 is a perspective view of a transparent embodiment of the present invention.
Figure 1A:
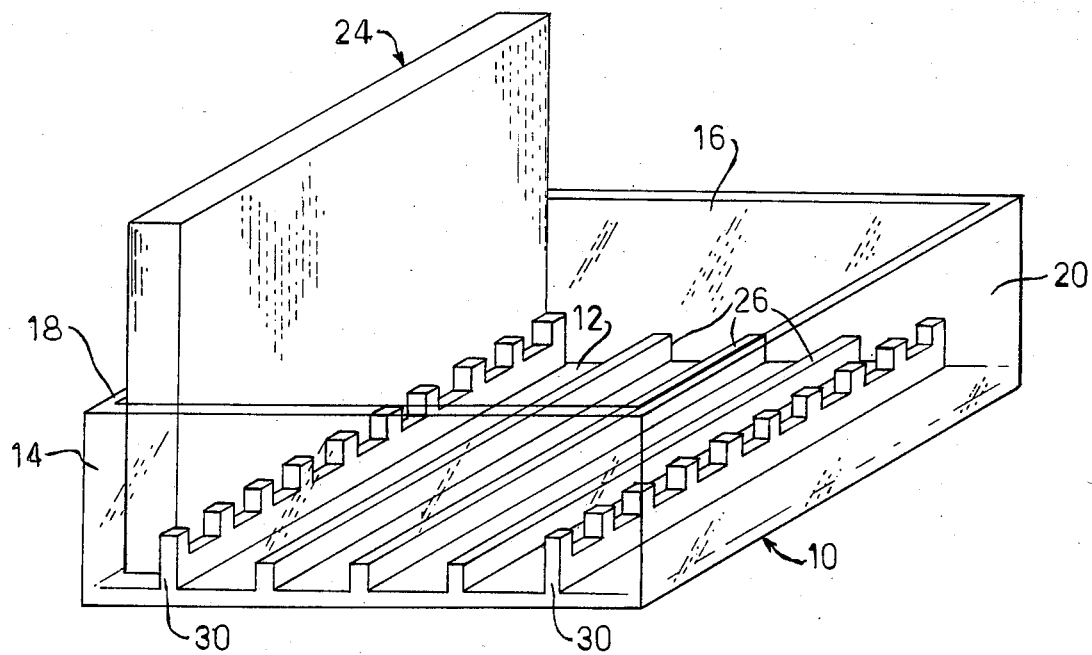
FIG. 1A is a perspective view of the case shown in FIG. 1 but showing a cassette box stored in the case section.

Reference now is made to FIGS. 1 and 1A wherein a case which includes a single section 10 is shown comprising a generally rectangular shaped bottom wall 12, front and back walls 14 and 16, respectively, and opposite side walls 18 and 20. The single section 10 is adapted to hold either a plurality of generally rectangular shaped objects of one size, such as cassette tapes 22, one of which is shown in FIG. 1, or a plurality of generally rectangular shaped objects of a larger size, such as cassette tape boxes 24, one of which is shown in FIG. 1A. The case may be formed as by molding, for example, from clear proprionate or other plastic, to enable ready external identification of the stored cassettes and their boxes, or the like.

Figure 2:
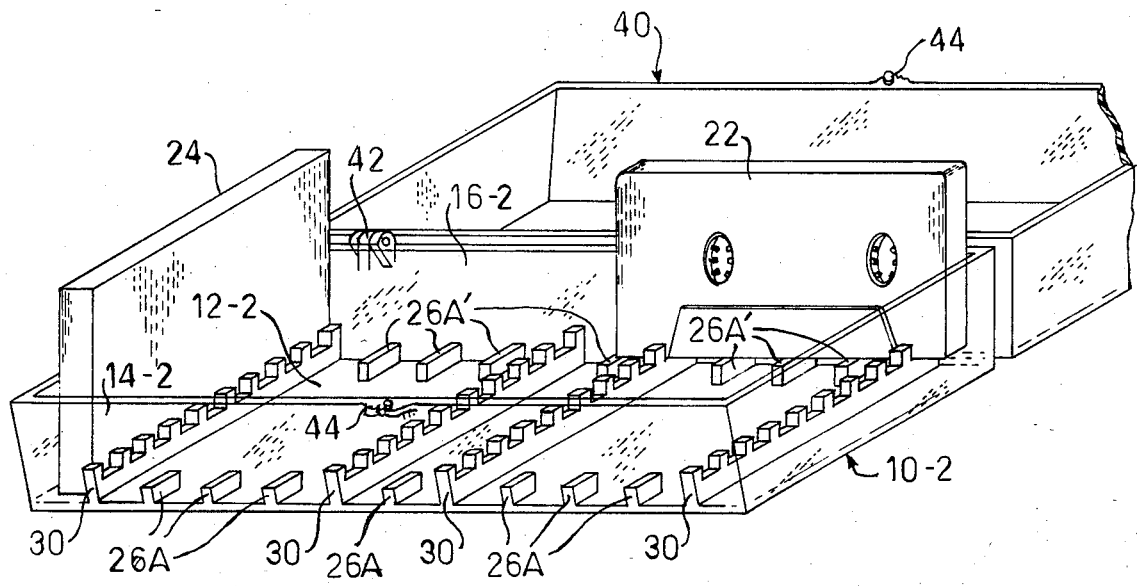
FIGS. 2 through 4 are perspective views showing different embodiments of the invention.
Figure 3:
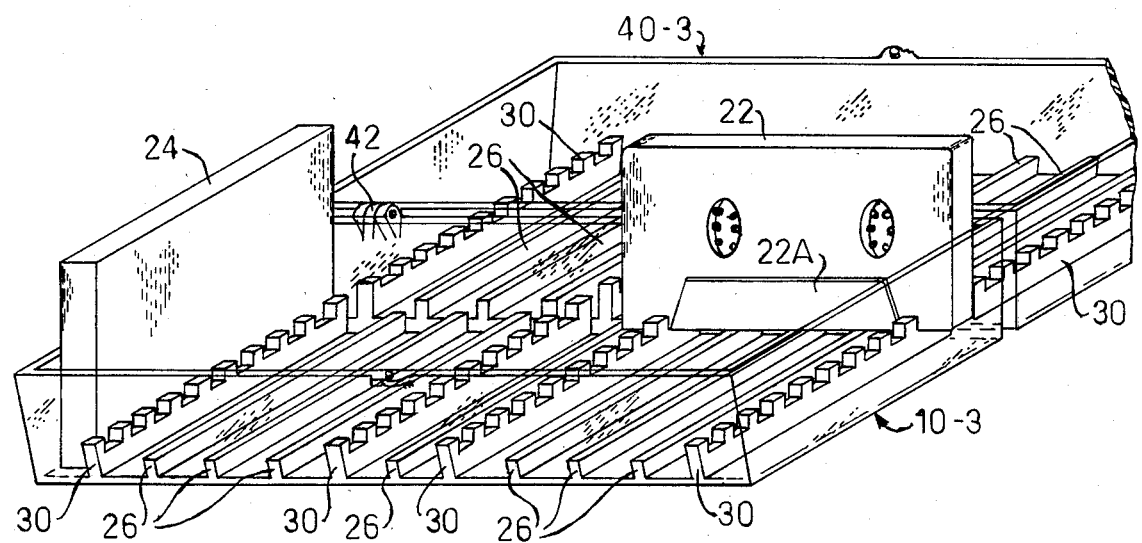
Figure 4:
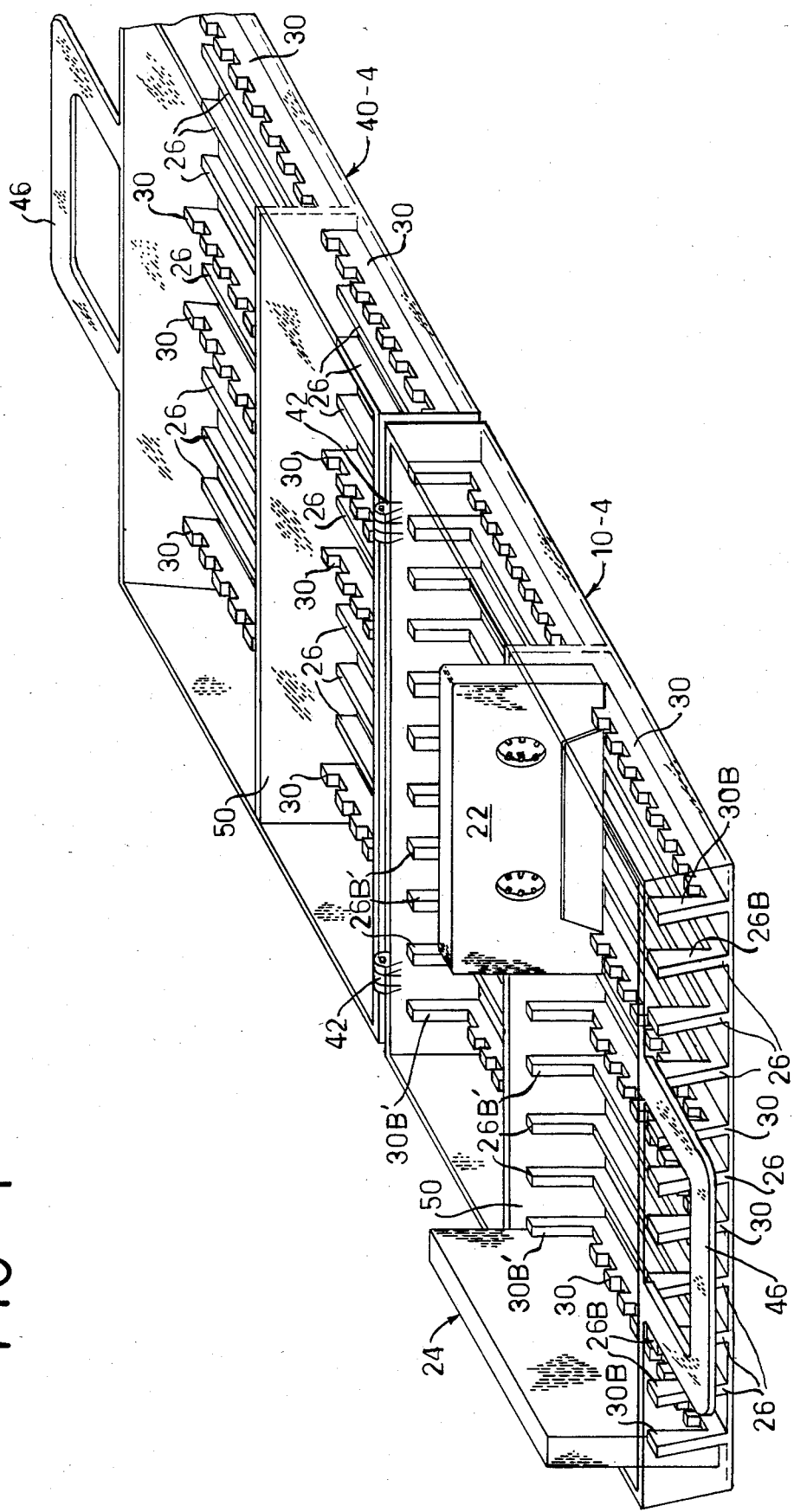

The distance between the front and rear walls 14 and 16 of the one section case shown in FIGS. 1 and 1A (or of each section of a multiple section case in the embodiments of the invention shown in FIGS. 2 through 4) is slightly greater than the length of the cassette box 24; and the distance from side-to-side of a one section case, i.e. between side walls 18 and 20 of the case shown in FIGS. 1 and 1A (or of each section of a multiple section case in the embodiments shown in FIGS. 2 through 5) is slightly greater than the length of the cassette 22.

In accordance with the present invention the bottom wall 12 is provided with a plurality of parallel ribs 26 and 30 which ribs extend parallel with the side walls 18 and 22. The ribs are spaced an equal distance apart and from the side walls. The spacing of the ribs is such as to accommodate cassette boxes between adjacent ribs, and between the end ribs and side walls. The bottom of the cassette box rests on the bottom wall 12 and fits snugly between and is held upright by the ribs 26 and 30 and side walls 18 and 20. As noted above, the distance between the front and rear walls is slightly greater than the length of the cassette box 24 thereby minimizing back and forth sliding motion of the boxes in the case.

The ribs 30 are taller than the ribs 26 and the upper edges of the taller ribs 30 are notched as illustrated. A pair of notched ribs 30 is included in each section, and the spacing between the notched ribs is such that the portion of a cassette 22 outwardly from the flanged portion 22A of the cassette will fit snugly and be held upright in the notches facing each other on the pair of notched ribs. Lower ribs 26 extend upwardly from the bottom wall of the case to a height no greater than the lower height of the notches formed in ribs 30 in the regions over which cassette tapes 22 are adapted to be stored, so as not to interfere with storage of cassette tapes in the notched ribs. The bottom of the cassette 22 rests on the bottom of the notches; and the flange 22A, being wider than the width of the notches, prevents the cassette from sliding sideways in the storage case. It will be apparent, then, that either cassettes 22 or cassette boxes 24 may be stored in a single section of a case. In the FIG. 1 and 1A embodiment, the one section case is adapted to hold either six cases 24 or nine cassettes 22 in substantially the same volume, with a minimum of waste space. Cassettes are elevated above the bottom 12 of the case so that the tops of the cassettes are at substantially the height of the tops of cassette boxes.

Reference now is made to FIG. 2 wherein a modified form of storage case is shown to comprise a two section bottom box portion 10-2 and top portion 40 rearwardly hinged at 42. The front faces of the bottom portion 10-2 and top portion 40 are inclined outwardly to enable closing over the stored cassettes and their boxes and locking at 44. The rectangular shaped bottom wall 12-2 is approximately twice the size of the single section case shown in FIGS. 1 and 1A, and includes two sets of ribs to double the storage space.

Ribs 26A and 26A' are provided on the bottom wall 12-2 adjacent the front and back walls 14-2 and 16-2, respectively, between notched ribs 30 in lieu of the full length ribs 26 shown in the embodiment of FIGS. 1 and 1A. Also, one set of ribs 26A and 26A' is located at the center of the bottom wall between the inner notched ribs 30. Obviously, alternative lengths, number and configurations of ribs 26A, 26A' are functionally within the scope of the present invention.

As in the FIGS. 1 and 1A arrangement, the spacing between ribs 26A or 26A' is just slightly greater than the thickness of the cassette box 24 in order to reliably position, store and maintain the boxes against dislodging in parallel stored locations in either or both sections of the case. Cassettes 22 are supported by pairs of notched ribs 30 in the manner described above with reference to FIG. 1. In the embodiments shown in FIGS. 2, 3, and 4 the height from the bottom inside surface of the bottom portion of the storage case of the lower surface of the notch in notched ribs 30 is such that the top of the cassette 22 when placed in a notch of the storage case will be equal to or somewhat less than the top of the cassette box 24 when the cassette box is placed in a section of the storage case so that when the top (40 in FIG. 2) is closed the cassettes and cassette boxes will be firmly held in place.

The FIG. 3 arrangement is similar to that of FIG. 2 except that both the bottom 10-3 and top 40-3 are provided with ribs 26 and 30 such that when the top is opened, cassettes and/or cassette boxes may be stored therein to duplicate the storage faciltes of bottom case portion.

The embodiment shown in FIG. 4 is similar to those of FIGS. 2 and 3 except that four section bottom and top case portions 10-4 and 40-4 are shown, together with handles 46 for convenience in carrying the case in the case closed condition. The bottom and top case portions are provided with a central dividing wall 50 extending parallel to the front and rear walls of the case to limit sliding of cassette boxes stored therein. Also, as seen in FIG. 4, ribs 26 and 30 in the bottom section 10-4 may include upwardly extending portions 26B and 26B', and 30B and 30B' along the front, rear and/or dividing walls of the bottom section to further assure that cases 24 located in the bottom portion are held upright to properly locate the same between ribs formed in the top portion 40-4 to facilitate closure of the case when desired. Such upwardly extending rib portions further prevent tipping of cassette boxes stored therein, but do not interfere with the storage of cassette tapes in end notches of notched ribs 30.

The invention having been described in detail in accordance with requirements of the patent statutes, various other changes and modifications will suggest themselves to those skilled in this art. For example, the storage device may simply comprise a bottom wall formed with ribs, such as ribs 26 and 30, without front, back, or side walls and cover. Alternatively, such a separately formed bottom wall with ribs may be located inside a walled box, instead of the walls being integrally formed therewith. It is intended that the above and other such changes and modifications which occur to those skilled in this art shall fall within the spirit and scope of the invention as defined in the appended claims.

I claim:

1. A storage device for storing magnetic tape cassettes and their boxes, each of which boxes is adapted to hold an individual magnetic tape cassette, comprising: a bottom portion which includes at least one section capable of receiving a plurality of magnetic tape cassettes or a plurality of their boxes, said section including a bottom wall having a plurality of parallel ribs extending upwardly therefrom, the spacing between adjacent ribs being slightly greater than the width of the cassette boxes whereby cassette boxes may be stored in an upright position on the bottom wall between adjacent ribs, one pair of said ribs being higher than the other ribs extending upwardly above said other ribs, and means forming spaced notches along the upper edge of said higher ribs which notches have a width slightly greater than the width of portions of the cassette tapes for support of cassette tapes in an upright position and a direction transversely to the parallel ribs.

2. A storage device as defined in claim 1 which includes a plurality of said sections, the ribs in each section extending parallel to the ribs in other sections.

3. A storage device as defined in claim 2 wherein at least two of said sections are located side by side and including one rib between adjacent pair of said higher notched ribs.

4. A storage device as defined in claim 2 wherein at least two of said sections are located front to back and including a dividing wall between said sections to limit sliding of cassette boxes between said sections.

5. A storage device as defined in claim 2 which includes four sections in a rectangular configuration, and a dividing wall between first and second pairs of said sections to limit sliding of cassette boxes therebetween.

6. A storage device as defined in claim 1 including front and back walls and opposite side walls extending upwardly from said bottom wall and together with said bottom wall forming said bottom portion, and a rearwardly hinged top portion for the bottom portion.

7. A storage device as defined in claim 6 wherein said top portion is of dimensions similar to the bottom portion of the case and also includes sets of ribs to provide duplicate storage faciltes to the bottom portion when the top portion is opened back upon itself.

8. A storage device as defined in claim 6 including handles on said top and bottom portions extending forwardly thereof to enable carrying of the closed case.

9. A storage device as defined in claim 6 wherein ribs in said bottom case portion include upwardly extending portions along the front and back walls thereof for additional vertical support of cassette boxes stored therein.

10. A storage device as defined in claim 1 wherein the ribs between the pair of notched ribs extend upwardly from the bottom wall to a height no greater than the lower height of the notches formed in the notched ribs in the regions over which cassette tapes are stored.

11. A storage device as defined in claim 1 wherein said wall and ribs are substantially transparent to enable identification of the stored contents.

12. A storage device as defined in claim 1 wherein cassette tapes for storage in the storage device have flanges at the middle lower section thereof which make the same wider in the middle section than outwardly from the middle flanged section, and wherein the width of the notches is less than the width of cassette tapes at the flanges and the spacing between said pair of notched ribs is slightly greater than the length of the flanges to limit movement of the cassette tapes in a direction transversely to the parallel notched ribs.

13. A storage device for storing magnetic tape cassettes and their boxes comprising a bottom portion which includes at least one section capable of receiving a plurality of magnetic tape cassettes or a plurality of their boxes, said section including a bottom wall having a plurality of parallel ribs extending upwardly therefrom, the spacing between adjacent ribs being slightly greater than the width of the cassette boxes whereby cassette boxes may be stored on the bottom wall between adjacent ribs, one pair of said ribs being higher than the other ribs extending upwardly above said other ribs, and means forming spaced notches along the upper edge of the said higher ribs which notches have a width slightly greater than the width of portions of the cassette tapes for support of cassette tapes in a direction transversely to the parallel ribs, the ribs between said higher ribs being segmented.

14. A storage device as defined in claim 13 including front and back walls extending upwardly from said bottom wall, said segmented ribs including sections adjacent the front and back walls.

* * * * *